(12) United States Patent
Lee et al.

(10) Patent No.: US 11,681,756 B2
(45) Date of Patent: Jun. 20, 2023

(54) METHOD AND ELECTRONIC DEVICE FOR QUANTIFYING USER INTEREST

(71) Applicant: Samsung Electronics Co., Ltd., Gyeonggi-do (KR)

(72) Inventors: Yuwon Lee, Gyeonggi-do (KR); Hwangki Min, Gyeonggi-do (KR); Sungmin Rhee, Gyeonggi-do (KR); Shunghyun Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 82 days.

(21) Appl. No.: 16/944,761

(22) Filed: Jul. 31, 2020

(65) Prior Publication Data

US 2021/0034677 A1 Feb. 4, 2021

(30) Foreign Application Priority Data

Aug. 2, 2019 (KR) .......................... 10-2019-0094528

(51) Int. Cl.
*G06F 16/9032* (2019.01)
*G06F 16/9038* (2019.01)
*G06F 16/906* (2019.01)
*G06F 40/30* (2020.01)

(52) U.S. Cl.
CPC ...... *G06F 16/90332* (2019.01); *G06F 16/906* (2019.01); *G06F 16/9038* (2019.01); *G06F 40/30* (2020.01)

(58) Field of Classification Search
CPC ............... G06F 16/3334; G06F 16/335; G06F 16/90332; G06F 16/9038; G06F 16/906; G06F 16/9535; G06F 40/30
See application file for complete search history.

(56) References Cited

U.S. PATENT DOCUMENTS

2006/0074883 A1 4/2006 Teevan et al.
2017/0351781 A1 12/2017 Alexander et al.
2018/0082197 A1 3/2018 Aravamudan et al.
(Continued)

FOREIGN PATENT DOCUMENTS

CN 106095983 11/2016
CN 109710845 5/2019

OTHER PUBLICATIONS

International Search Report dated Nov. 13, 2020 issued in counterpart application No. PCT/KR2020/010171, 9 pages.

*Primary Examiner* — Taelor Kim
(74) *Attorney, Agent, or Firm* — The Farrell Law Firm, P.C.

(57) ABSTRACT

An electronic device includes a memory configured to store a plurality of types of user data, and a processor configured to be operatively connected to the memory, wherein the processor is configured to generate an embedding vector through text embedding using first text data which is included in the user data and is related to content of the user data for each type of the user data; calculate a weight for the embedding vector using information which is included in the user data and is related to usability of the user data for each type of the user data; when a query is input, generate a query vector through the text embedding using second text data included in the query; and quantify user interest in the query for each type of the user data based on the embedding vector, the weight for the embedding vector, and the query vector.

10 Claims, 9 Drawing Sheets

(56) References Cited

U.S. PATENT DOCUMENTS

2018/0137137 A1* 5/2018 Jin .................... G06F 16/90324
2018/0253496 A1   9/2018 Natchu
2018/0322880 A1  11/2018 Vuskovic et al.
2018/0365579 A1* 12/2018 Wan .................... G06K 9/6274

* cited by examiner

METHOD AND ELECTRONIC DEVICE FOR QUANTIFYING USER INTEREST

CROSS-REFERENCE TO RELATED APPLICATION(S)

This application is based on and claims priority under 35 U.S.C. § 119 to Korean Patent Application No. 10-2019-0094528, filed on Aug. 2, 2019, in the Korean Intellectual Property Office, the entire disclosure of which is incorporated herein by reference.

BACKGROUND

1. Field

The disclosure relates generally to techniques for quantifying user interest.

2. Description of Related Art

An electronic device such as a smart phone can provide service to a user by using a user profile. For example, the electronic device may provide personalized service tailored to the user using information such as the user's age, gender, occupation, residence, or interest. The user profile used to provide such a personalized service can be significantly beneficial information not only for the user but also for the provider of the personalized service.

A method of acquiring information on user interests in the user profile may include directly obtaining the corresponding information from a user and indirectly estimating and obtaining the corresponding information from data related to the user (hereinafter, referred to as "user data").

The method of directly obtaining the information from the user may include a method of inducing the user to input information on interests through a user interface and obtaining information on user interests based on the inputted information.

The method of indirectly estimating and obtaining the information from the user data may include a method of estimating and determining user interests based on user data such as information on which applications (hereinafter, referred to as "apps") the user has installed and used (app usage information), information on which websites the user has visited (website visit information), or information on which searches were attempted (search information).

The method of estimating user interest may include quantifying user interest in an item of interest based on a machine-learning technique, such as a pattern classification technique. The method of estimating user interest based on the machine-learning technique may include selecting items of interest to be estimated, designing a binary pattern classification model for each item, collecting user data from a personal terminal device, learning an interest estimation model based on the collected user data (learning data), and quantifying user interest by applying the user data collected from the personal terminal device to the interest estimation model.

However, in an existing method of estimating user interest, since collecting user data and learning of the interest estimation model based on the collected user data are substantially performed in a server, a process of transmitting the user data from each personal terminal device to the server is necessary.

In addition, in an existing method of estimating user interest, it is difficult to quantify user interest in an item of interest that is not previously defined, such as an item for which an interest estimation model does not exist.

In addition, in an existing method of estimating user interest, since the number of interest estimation models is equal to the number of interest items to be estimated, a large amount of resources is consumed in designing, learning, managing, and maintaining a large number of interest estimation models.

SUMMARY

The present disclosure has been made to address the above-mentioned problems and disadvantages, and to provide at least the advantages described below.

In accordance with an aspect of the disclosure, an electronic device includes a memory configured to store at least one type of user data; and a processor configured to be operatively connected to the memory, wherein the processor is configured to generate an embedding vector through text embedding by using first text data which is included in the user data and is related to content of the user data for each type of the user data; calculate a weight for the embedding vector using information which is included in the user data and is related to usability of the user data for each type of the user data; when a query is input, generate a query vector through the text embedding using second text data included in the query; and quantify user interest in the query for each type of the user data based on the embedding vector, the weight for the embedding vector, and the query vector.

In accordance with another aspect of the disclosure, a method of quantifying user interest by an electronic device includes generating an embedding vector through text embedding using first text data which is included in at least one type of user data stored in a memory of the electronic device and is related to content of the user data for each type of the user data; calculating a weight for the embedding vector using information which is included in the user data and is related to usability of the user data for each type of the user data; when a query is input, generating a query vector through the text embedding using second text data included in the query; and quantifying user interest in the query for each type of the user data based on the embedding vector, the weight for the embedding vector, and the query vector.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
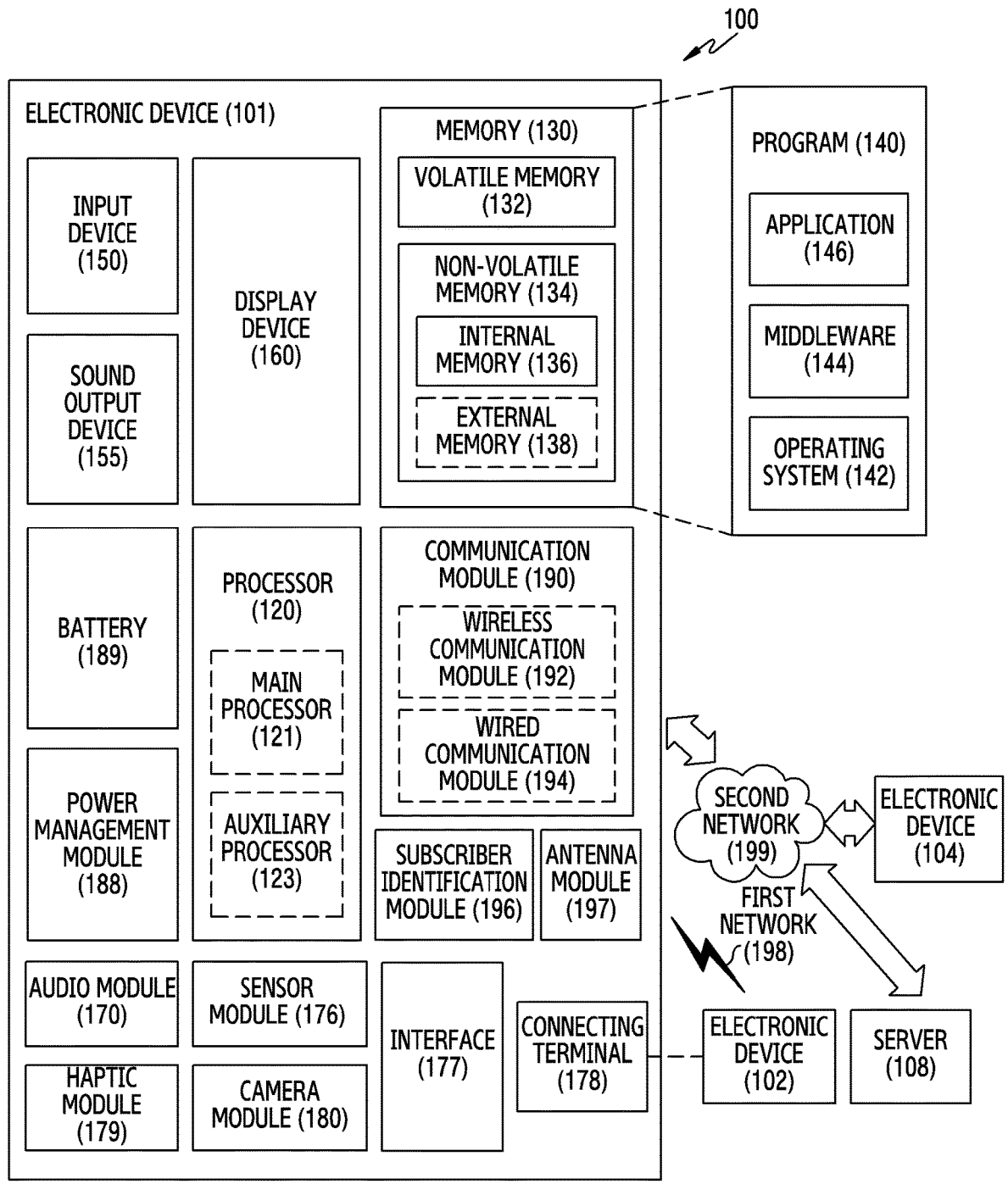
FIG. 1 is a block diagram illustrating an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Various embodiments of the disclosure may provide a method of quantifying user interest through text embedding and an electronic device supporting the same.

FIG. 1 is a block diagram illustrating an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
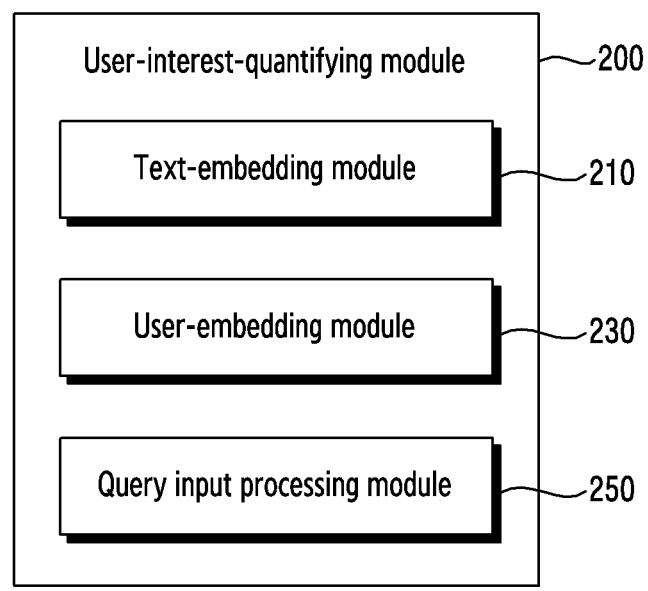
FIG. 2 is a diagram illustrating a user-interest quantifying module of an electronic device, according to an embodiment.

FIG. 2 is a diagram illustrating a user-interest quantifying module of an electronic device, according to an embodiment. The user-interest-quantifying module 200 of FIG. 2 may be implemented as a hardware or software component of the electronic device 101 described in FIG. 1. The user-interest-quantifying module 200 may be implemented in the form of a program 140 stored in the memory 130 of the electronic device 101. The user-interest-quantifying module 200 may be implemented with an instruction stored in the memory 130, and when the instruction is executed by the processor 120, the processor 120 may perform a function corresponding to the instruction.

Referring to FIG. 2, the user-interest-quantifying module 200 may include a text-embedding module 210, a user-embedding module 230, and a query input processing module 250.

The text-embedding module 210 may convert text data into a vector through text embedding. The text embedding may represent a function of converting text data into one real-number vector in a finite-dimensional vector space. The vector is a semantic representation, and text data having a similar meaning can be converted into a similar vector in a vector space. For example, if a plurality of pieces of text data that are highly correlated with each other in a semantic sense (i.e. have similar meanings) are converted into vectors through the text embedding, the converted vectors may be located close to each other in the vector space, and if a plurality of pieces of text data that are weakly correlated with each other in a semantic sense (i.e. have dissimilar meanings) are converted into vectors through the text embedding, the converted vectors may be located far from each other in the vector space. The similarity between the vectors may be calculated in various ways (e.g., a method of applying a cosine similarity function), and may be expressed as a value between 0 and 1.

The text embedding may include at least one of word embedding, sentence embedding, or document embedding. As an example of an embedding technique, the word embedding may include a word2vec model, sentence embedding may include a sent2vec model, and the document embedding may include a doc2vec model. The embedding technique may be an unsupervised learning method that learns how to configure items having similar meanings in words, sentences, or documents given in learning data to be located close to each other in the vector space.

The text-embedding module 210 may construct a text-embedding engine for the text embedding. The text-embedding engine may perform a function (text embedding) of outputting a real-number vector in a vector space using text data as input. In order to construct the text-embedding engine, the text-embedding module 210 may collect embedding learning data and may learn text embedding based on the collected learning data. The learning data may include an arbitrary document written in one language, such as news or a Wikipedia™ document. In addition, in order to learn the text embedding, the text-embedding module 210 may select and use at least one of the embedding techniques (e.g., word embedding, sentence embedding, and document embedding). The text-embedding module 210 may construct the text-embedding engine for each language.

The user-embedding module 230 may represent a user through user embedding. "User embedding" may indicate a function of expressing a user as one real-number vector in a finite-dimensional vector space and a set of weights of the real-number vector using user data. The user embedding may include a process of converting content-related text data included in the user data into a vector through the text-embedding module 210 (or the text-embedding engine), and a process of calculating a weight for the vector in usability-related information included in the user data. Here, the user data may be obtained based on a user log and related metadata. The user data may include information on which app has been installed and used in the electronic device (app usage information), information on which website the user has visited (website visit information or website titles information), or information on which one or more searches were attempted (search information or search keyword information).

The type (kind) of the user data distinguishes the above-mentioned three types (e.g., app usage type, website visit type, and search type) of information (e.g., the app usage information, the website visit information, and the search information). In addition, the usability-related information included in the user data may include information on how much, how often, or how recently the content included in the user data was used (or visited or searched for). However, the type of the user data is not limited thereto. Since the user data can be obtained based on the user log and the related metadata in the electronic device 101, the user data may be obtained through various types of information that can be converted to text (e.g., conversion to text 831 in FIG. 8), in addition to the above-mentioned three pieces of information (e.g., the app usage information, the website visit information, and the search information). Accordingly, the type of the user data may also include a type that distinguishes the various types of information in addition to the types (e.g., the app usage type, the website visit type, and the search type) that distinguish the above-described three pieces of information.

In order to convert the content-related text data included in the user data into a vector, the user-embedding module 230 may extract text data from the content included in the user data. The text data extracted from the content included in the user data may correspond to key text (e.g., a keyword, a key phrase, or a key sentence). The user-embedding module 230 may cluster the converted vectors into a plurality of groups.

Through the user embedding, the user data (u) may be expressed by Equation (1).

$$u=\{(v_t^i, w_t^i)| t \in \{\text{app,kwd,title}\}, i=1, \ldots N_t\} \quad (1)$$

Here, subscript t denotes the type of user data, $N_t$ denotes the number of pieces of user data of type t consumed by the corresponding user, $v_t^i$ denotes an i-th content vector or embedding vector (a result obtained by converting content-related text data included in user data through a text-embedding engine) of type t as a real-number vector in a finite-dimensional vector space, and $w_t^i$ denotes a weight for $v_t^i$ (usage weight) (a result calculated from usability-related information included in the user data).

The user embedding may be performed differently based on the characteristics of each type of user data. For example, when the type of the user data is the app usage type, the content vector (or embedding vector) $v_{app}^i$ may be generated by converting key text extracted from the name, category, and description of an i-th app used by the corresponding user through the text-embedding engine. In addition, the weight $w_{app}^i$ for the content vector (or embedding vector) may be calculated through Equation (2).

$$w_{app}^i = \tau^{\alpha^i} \sigma(\beta^i) \sigma(\gamma^i) \quad (2)$$

Here, $\alpha^i$ denotes the elapsed time from when the i-th app was last used to the present, $\beta^i$ denotes the total number of times the app was used, and $\gamma^i$ denotes the total time that the app was used. $\tau$ is a variable that determines the degree of attenuation over time, and may be expressed as a value between 0 and 1, and $\sigma(\ )$ denotes a logistic sigmoid function.

When the type of the user data is the website visit type or the search type, the content vector (e.g., $v_{title}^i$) or the embedding vector (e.g., $v_{kwd}^i$) may be extracted from the title or search keyword of a visited webpage in a manner similar to the app usage type. At this time, there may be a problem in that the number and types of webpage titles and search keywords are infinite, and a clustering process may be performed to solve the problem.

The query input processing module 250 may quantify user interest in an input query. When an input query is given, the query input processing module 250 may convert text data included in the input query into a vector (e.g., a query vector) through the text-embedding engine. The converted vector is represented by a single point in a finite-dimensional vector space, and since the vector exists in the same vector space as the content vector or the embedding vector, a direct similarity comparison may be possible.

The user interest $\Phi_t$ may be quantified for each user data type t, and may be quantified as a score using Equation (3).

$$\Phi_t(u, q) = \max_{(v_t^i, w_t^i) \in u} (w_t^i C(v_t^i, q)) \qquad (3)$$

Here, $C(v_t^i, q)$ denotes the similarity between the content vector or the embedding vector $v_t^i$ and the query vector q. For example, the similarity may be calculated through cosine similarity. In addition, $w_t^i$ denotes the weight of the content vector or the embedding vector $v_t^i$. That is, user interest in the user data type t may be quantified as the largest value (or score) among values obtained by multiplying the similarity between the content vector or the embedding vector $v_t^i$ and the query vector q by the weight.

The final user interest $\Phi$ in the input query may be quantified as a sum of weights of the user interests quantified for each user data type t using Equation (4).

$$\Phi(u,q) = \lambda_{app}\Phi_{app}(u,q) + \lambda_{kwd}\Phi_{kwd}(u,q) + \lambda_{title}\Phi_{title}(u,q) \qquad (4)$$

Here, $\lambda_t$ denotes a weight for the user data type t. That is, the final user interest may be quantified as a sum of values obtained by multiplying the user interest by weights for each user data type t.

Figure 3:
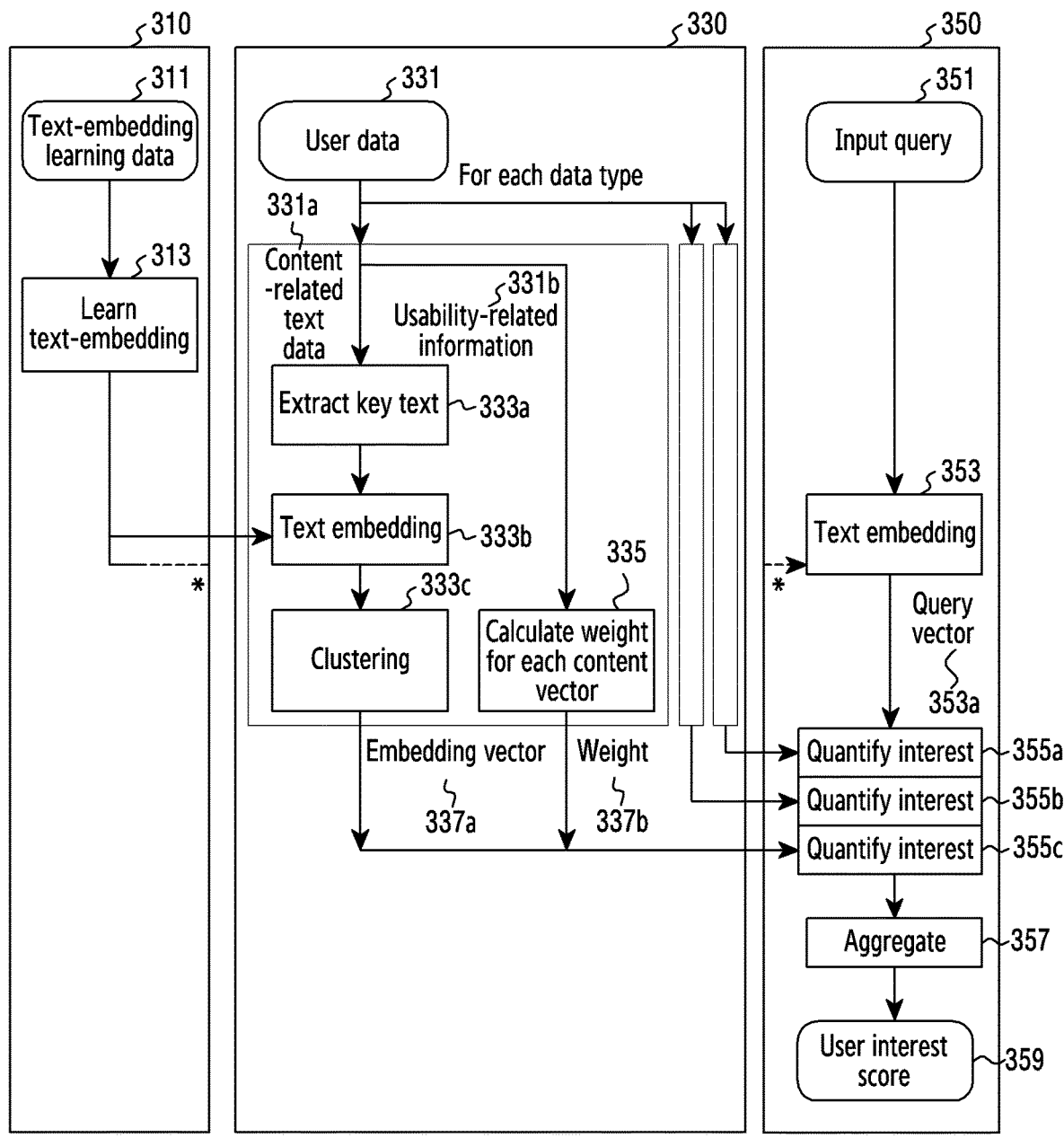
FIG. 3 is a diagram illustrating a process of quantifying user interest in an electronic device, according to an embodiment.

FIG. 3 is a diagram illustrating a process of quantifying user interest in an electronic device, according to an embodiment.

Referring to FIG. 3, a process of quantifying user interest may include a process of constructing a text-embedding engine 310, a user-embedding process 330, and a process of quantifying user interest in an input query 350. Here, the process of constructing the text-embedding engine 310 and the user-embedding process 330 may be included in an offline process, and the process of quantifying the user interest in the input query 350 may be included in an online process. Here, the online process refers to a process that is performed in real time when a query is input, and the offline process refers to a process that is performed separately from the input query in a batch method, rather than a process that requires real-time processing according to input.

In the process of constructing the text-embedding engine 310, a text-embedding module included in a user-interest quantifying module may collect text-embedding learning data 311, and may learn text embedding 313 based on the collected text-embedding learning data 311 to construct a text-embedding engine. The text-embedding learning data 311 may include an arbitrary document written in one language. In addition, at least one embedding technique (e.g., word embedding, sentence embedding, and document embedding) may be used to learn the text embedding 313. The text-embedding engine may be constructed for each language.

In the user-embedding process 330, a user-embedding module included in the user-interest-quantifying module may extract 333a key text from the content included in the user data 331 to obtain content-related text data 331a included in the user data 331.

The user-embedding module may convert the content-related text data 331a included in the user data 331 into an embedding vector 337a in a vector space through text embedding 333b. The user-embedding module may cluster 333c the converted embedding vectors 337a into a plurality of groups according to the type of the user data 331.

The user-embedding module may calculate a weight 337b for the embedding vector 337a using usability-related information 331b included in the user data 331. At this time, the user-embedding module may calculate 335 the weight 337b for each content vector (e.g., the embedding vector 337a). The usability-related information 331b included in the user data 331 may include information on how much, how often, or how recently the content included in the user data 331 was used, visited or searched for.

The user-embedding module may perform the user-embedding process for each type of the user data. For example, the user-embedding module may obtain the embedding vector 337a and the weight 337b for the embedding vector 337a for each type of the user data. That is, the embedding vector 337a and the weight 337b for the embedding vector 337a, which are obtained in the user-embedding process 330, may be separately obtained for each type of the user data.

In the process of quantifying the user interest in the input query 350, a query input processing module included in the user-interest-quantifying module may quantify user interest in an input query 351. The query input processing module may convert text data included in the input query 351 into a query vector 353a through text embedding 353. Since the query vector 353a exists in the same vector space as the embedding vector 337a, a direct similarity comparison may be possible. The similarity may be calculated based on cosine similarity.

The query input processing module may quantify a user interest of a first data type 355a, quantify a user interest of a second data type 355b, and quantify a user interest of a third data type 355c in the input query 351 as the largest value among values obtained by multiplying the similarity between the embedding vector 337a and the query vector 353a by the weight 337b. In addition, the query input processing module may quantify the user interest of the first data type 355a, quantify the user interest of the second data type 355b, and quantify the user interest of the third data type 355c based on the user data 331.

Next, the query input processing module may aggregate 357 the quantified user interest of the first data type 355a, the quantified user interest of the second data type 355b, and the quantified user interest of the third data type 355c for each type of the user data 331 to quantify a final user interest score 359 in the input query 351. The query input processing module may quantify the final user interest score 359 as a sum of weights of the quantified user interest of the first data type 355a, the quantified user interest of the second data type 355b, and the quantified user interest of the third data type 355c for each type of the user data 331.

Figure 4:
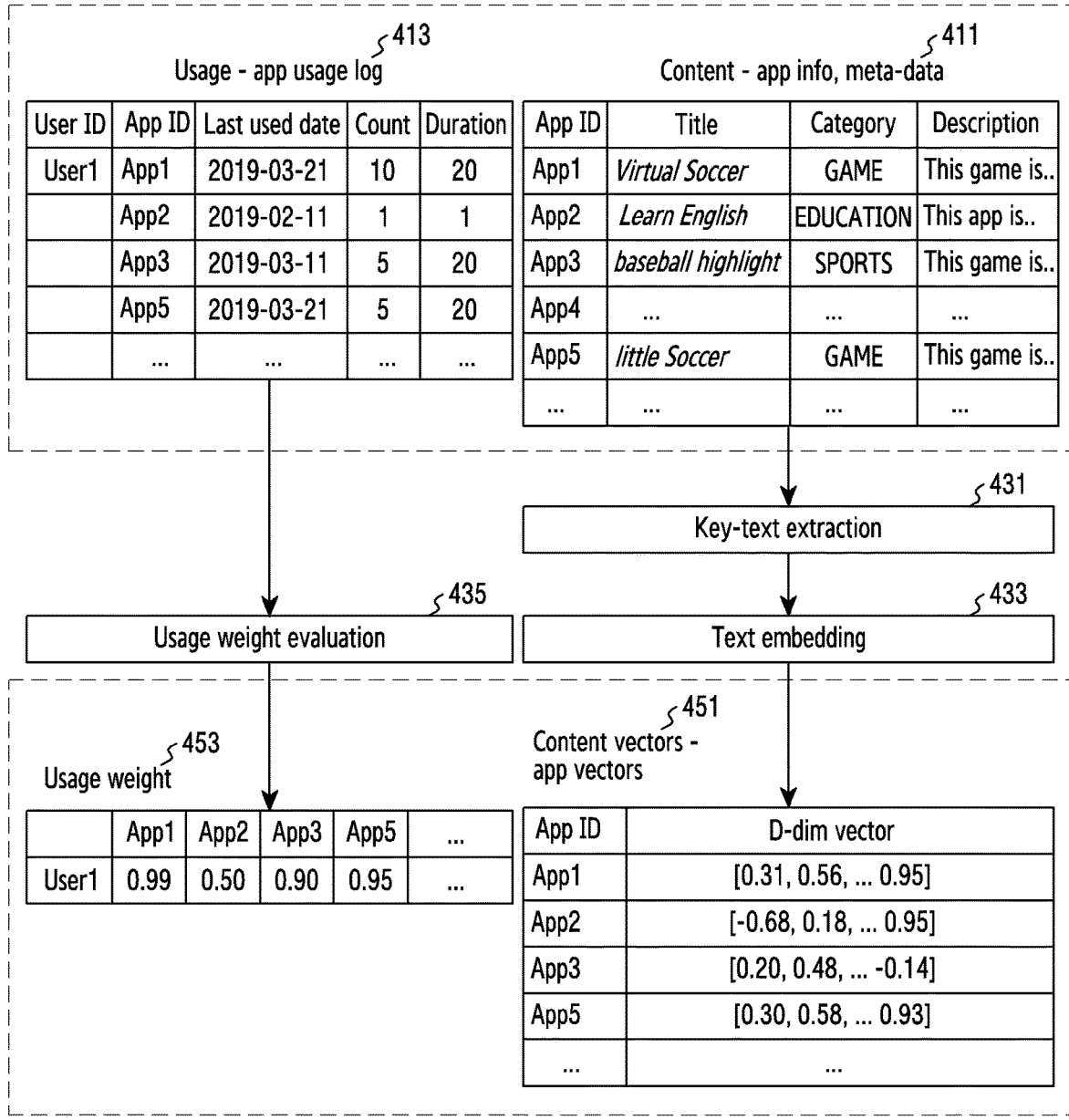
FIG. 4 is a diagram illustrating a user embedding process based on a usage log of an application of an electronic device, according to an embodiment.

FIG. 4 is a diagram illustrating a user-embedding process based on a usage log of an application of an electronic device, according to an embodiment.

Referring to FIG. 4, the user-embedding module may extract 431 key text from content 411 included in an app usage information to obtain text data related to the content 411 included in the app usage information. The content 411 included in the app usage information may be obtained from app info or metadata. For example, the content 411 included in the app usage information may include information on an app identification (ID), a title, a category, or a description of the corresponding app. In the example shown in FIG. 4, a first app (App1) and a fifth app (App5) are similar to a soccer game app, and a third app (App3) is similar to App1 and App5 in that App3 is a sports app. A second app (App2) is an educational app and is not closely related to the other apps.

The user-embedding module may convert the text data related to the content 411 included in the app usage information obtained through the above-described extraction processes 431 into a content vector (or embedding vector) 451 through text embedding 433. When the type of the user data is the app usage type, the content vector 451 may be referred to as an app vector.

The user-embedding module may use usability-related information 413 included in the app usage information to calculate 435 weights 453 for the content vectors 451. The usability-related information 413 included in the app usage information may include information on a user ID, an app ID, a last used date of the corresponding app, a count, or a duration. The weight 453 may be calculated for each app.

Figure 5:
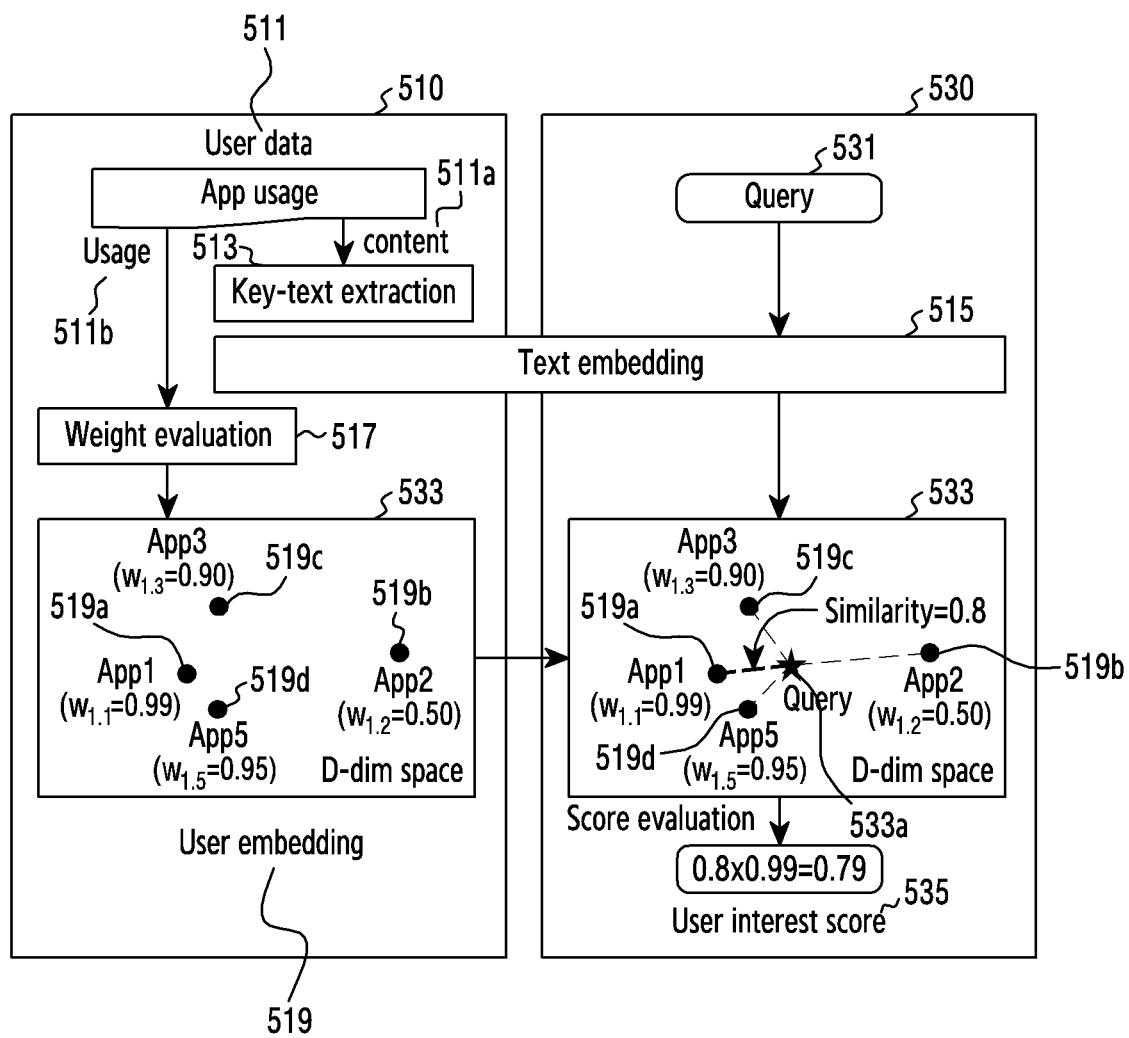
FIG. 5 is a diagram illustrating a process of quantifying user interest in an input query based on a result of user embedding of an electronic device, according to an embodiment.

FIG. 5 is a diagram illustrating a process of quantifying user interest in an input query based on a result of user embedding of an electronic device, according to an embodiment.

Referring to FIG. 5, a user-embedding module 510 included in a user-interest quantifying module may express a user as an embedding vector in a vector space and a set of weights of the embedding vector, using user data (e.g., app usage information, website visit information, or search information). FIG. 5 illustrates a user-embedding process when the type of the user data is an app usage type and the process of quantifying user interest in an input query based on a result of the user embedding.

The user-embedding module 510 may extract 513 key text from content 511a included in an app usage information 511 to obtain text data related to the content 511a included in the app usage information 511. The content 511a included in the app usage information 511 may be obtained from app info or metadata. For example, the content 511a included in the app usage information 511 may include information on an app ID, a title, a category, or a description of the corresponding app.

The user-embedding module 510 may convert the text data related to the content 511a included in the app usage information 511 obtained through the above-described extraction processes 513 into a content vector (or embedding vector) through text embedding 515. When the type of the user data is the app usage type, the content vector may be referred to as an app vector. In addition, as shown in FIG. 5, the content vector may be represented by one point (e.g., a first app vector 519a, a second app vector 519b, a third app vector 519c, or a fifth app vector 519d) in a finite-dimensional vector space 533 (a space corresponding to a D-dim vector). In the example illustrated in FIG. 5, it can be seen that, since App1 and App5 are similar to each other as soccer game apps, the first app vector 519a and the fifth app vector 519d are located significantly close to each other. Since App3 is also a sports-related app, the third app vector 519c is also located close to the first app vector 519a and the fifth app vector 519d, and the second app vector 519b is located far from the other app vectors because App2, which is an educational app, is not closely related to the other apps.

The user-embedding module 510 may use usability-related information 511b included in the app usage information 511 to calculate 517 weights for the content for the first app vector 519a, the second app vector 519b, the third app vector 519c, and the fifth app vector 519d. The usability-related information 511b included in the app usage information 511 may include information on a user ID, an app ID, a last used date of the corresponding app, a count, or a duration. The weight may be calculated for each app. In the example shown in FIG. 5, it can be seen that App5 has a greater weight because it was used more recently than App3, App1 has a greater weight because it was used more recently than App5, and App2 has a smaller weight because it was used once a long time ago compared to the other apps.

A query input processing module 530 included in the user-interest quantifying module may quantify user interest in the input query 531. When the input query 531 is given, the query input processing module 530 may convert text data included in the input query 531 into a query vector 533a through text embedding 515. The query vector 533a may also be represented by one point 533 (e.g., the query vector 533a) in a finite-dimensional vector space (the space corresponding to the D-dim vector). Since the query vector 533a exists in the same vector space 533 as the first app vector 519a, the second app vector 519b, the third app vector 519c, and the fifth app vector 519d, a direct similarity comparison may be possible.

The query input processing module 530 may quantify a score (a user interest score) 535 indicating user interest in the input query 531 as the largest value among values obtained by multiplying the similarity between the first app vector 519a, the second app vector 519b, the third app vector 519c, the fifth app vector 519d and the query vector 533a by the weight 453.

Figure 6:
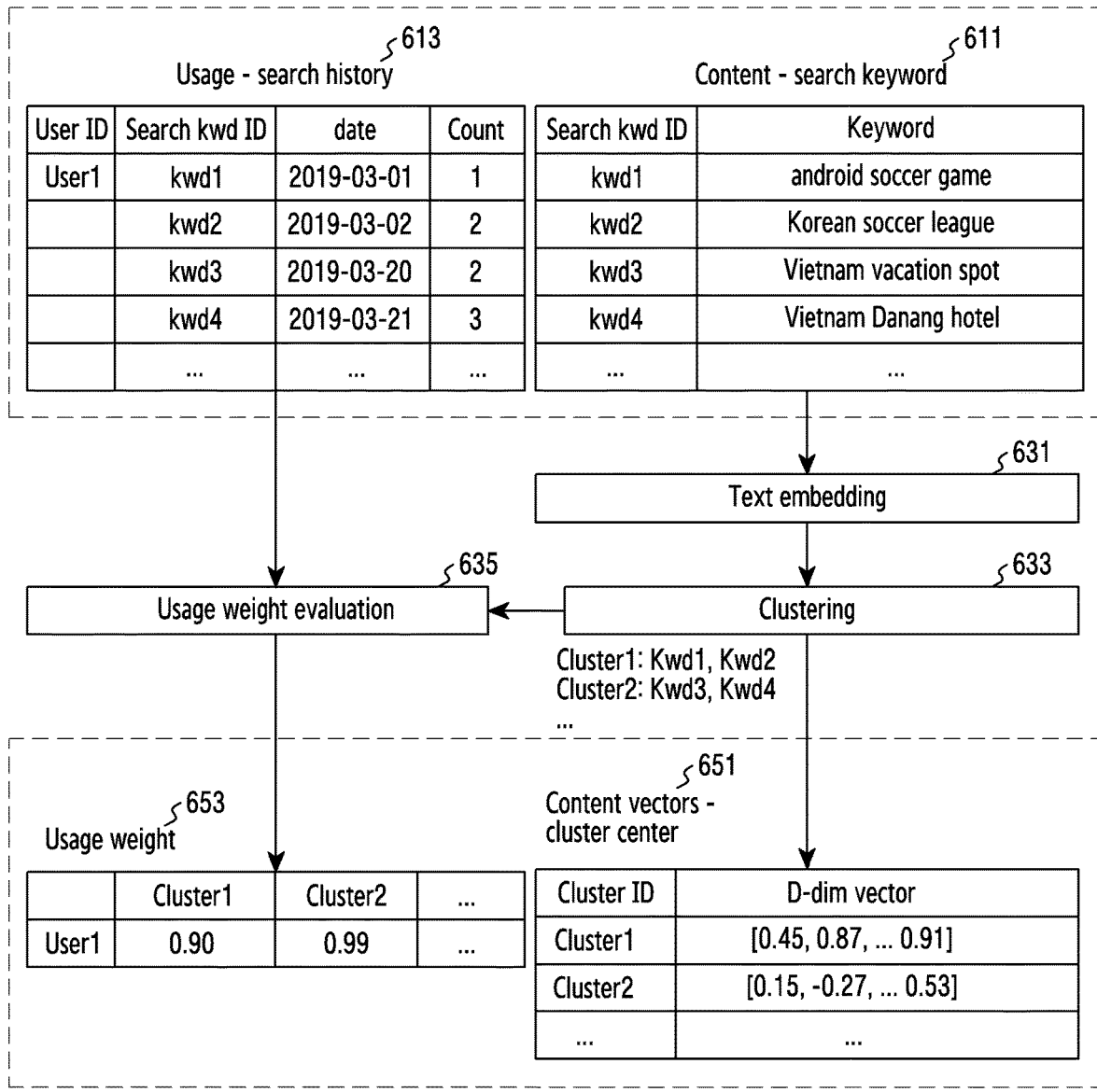
FIG. 6 is a diagram illustrating a user-embedding process based on a search log of an electronic device, according to an embodiment.

FIG. 6 is a diagram illustrating a user-embedding process based on a search log of an electronic device, according to an embodiment.

A user-embedding module included in a user-interest-quantifying module may express a user as an embedding vector in a vector space and a set of weights of the embedding vectors using user data (e.g., app usage information, website visit information, or search information). FIG. 6 illustrates a user-embedding process when the type of the user data is a search type.

Referring to FIG. 6, the user-embedding module may acquire a search keyword from content 611 included in search information. For example, the search keyword may be text data related to the content 611 included in the search information. The content 611 included in the search information may include a search keyword identifier (search kwd ID) and a keyword. In the example illustrated in FIG. 6, a first keyword kwd1 and a second keyword kwd2 are similar to each other as soccer-related search terms, and a third keyword kwd3 and a fourth keyword kwd4 are similar to each other as travel-related search terms.

The user-embedding module may convert text data (e.g., a search keyword) related to the content 611 included in the search information into a content vector or embedding vector 651 through text embedding 631. When the type of the user data is a search type or a webpage visit type, since the number and types of search keywords or webpage titles can be infinite, a clustering process 633 may be additionally performed. In the example illustrated in FIG. 6, it can be seen that, since the first keyword and the second keyword are similar to each other as soccer-related search terms, and the third keyword and the fourth keyword are similar to each other as travel-related search terms, the first keyword and the second keyword are included in a first cluster 1 (cluster1) and the third keyword and the fourth keyword are included in a second cluster (cluster2). When a cluster is configured by the clustering process 633, a cluster center of each cluster may be configured as a content vector or an embedding vector 651 for a cluster representing the content in the cluster.

The user-embedding module may calculate 635 a weight 653 for the content vector 651 using usability-related information 613 included in the search information. The usability-related information 613 included in the search information may include information on a user ID, a search keyword ID, a search date, or a search count. The weight 653 may be calculated for each search keyword. The weight 653 may be calculated for each cluster when the cluster is configured. In FIG. 6, it can be seen that, since the search terms of the second cluster (the third keyword and the fourth keyword) are more recently searched for than the search terms of the first cluster (the first keyword and the second keyword), the search terms of the second cluster have a greater weight than the first cluster.

Figure 7:
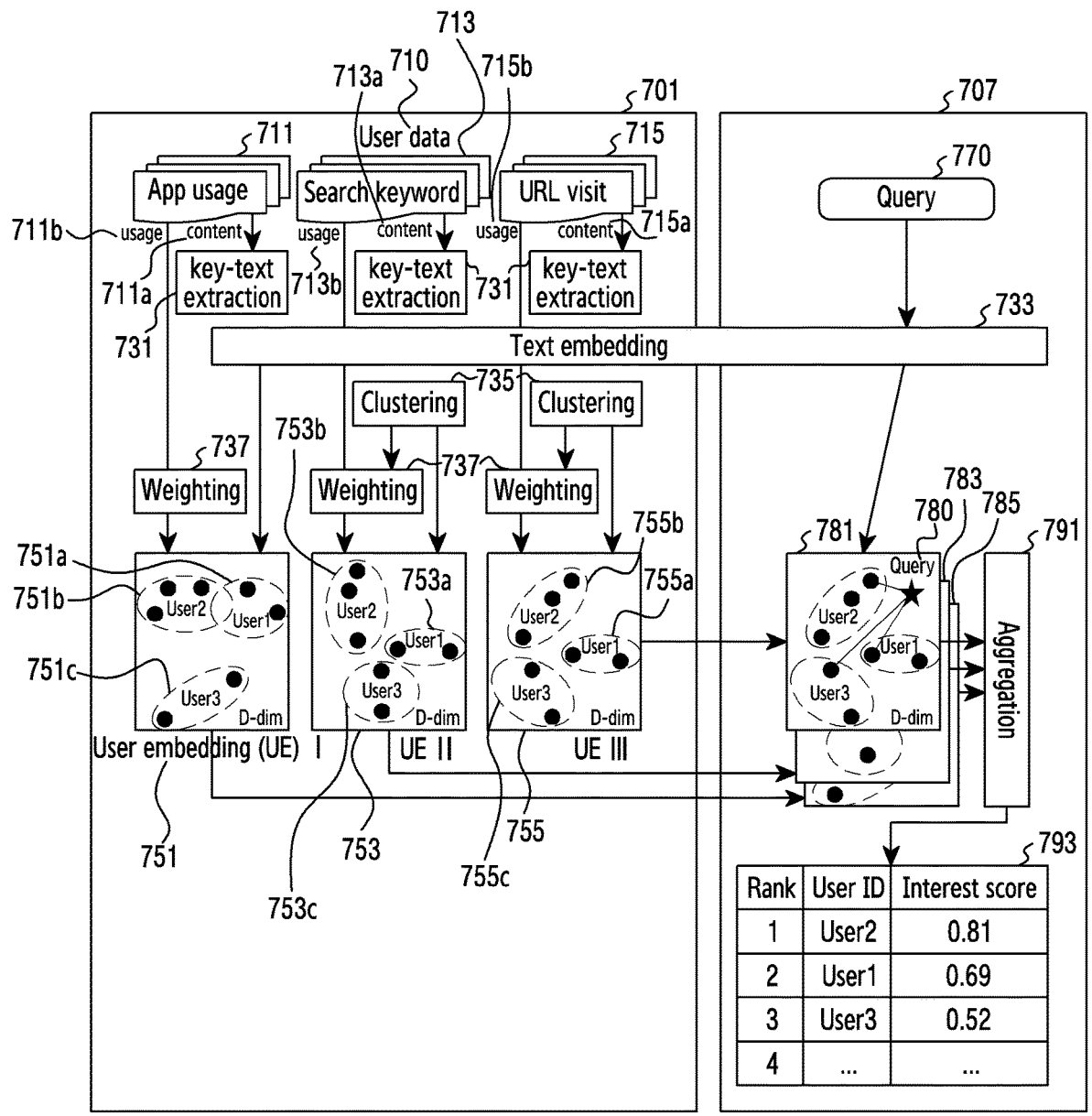
FIG. 7 is a diagram illustrating a method of quantifying user interests of a plurality of users of an electronic device, according to an embodiment.

FIG. 7 is a diagram illustrating a method of quantifying user interests of a plurality of users of an electronic device, according to an embodiment.

Referring to FIG. 7, a user-embedding module 701 included in a user-interest quantifying module may represent a user as an embedding vector in a first vector space 751, a second vector space 753, a third vector space 755, and a set of weights of the embedding vectors, using user data 710 (e.g., app usage information 711, search information 713, or website visit information 715). FIG. 7 illustrates a process of quantifying user interests of a plurality of users.

The user-embedding module 701 may extract 731 key text from first content 711a, second content 713a, and third content 715a included in the user data 710 for each type of the user data 710 in order to obtain text data related to the first content 711a, the second content 713a, and the third content 715a included in the user data 710. The user-embedding module 701 may convert, into a context vector or an embedding vector, the text data related to the first content 711a, the second content 713a, and the third content 715a included in the user data 710, obtained through the above-described extraction process 731, through text embedding 733. When the type of the user data 710 is the search type or the website visit type, the user-embedding module 701 may further perform a clustering process 735.

The user-embedding module 701 may calculate a weight for the content vector or embedding vector 737 using first usability-related information 711b, second usability-related information 713b, and third usability-related information 715b included in the user data 710. The weight may be calculated for each type of the user data 710 and for each user.

The content vector or embedding vector may be represented by one point in a finite-dimensional (D-dim) first vector space 751, second vector space 753, and third vector space 755, as shown in FIG. 7. For example, the content vector (or embedding vector) may be expressed in the first vector space 751, the second vector space 753, and the third vector space 755 for each type of the user data 710 and for each user together with the weight. The content vector or embedding vector may include a first content vector of a first user (user 1) 751a, a first content vector of a second user (user 2) 751b, and a first content vector of a third user (user 3) 751c for the app usage information 711; a second content vector for user 1 753a, a second content vector for user 2 753b, and a second content vector for user 3 753c for the search information 713; and a third content vector for user 1 755a, a third content vector for user 2 755b, and a third content vector for user 3 755c for the website visit information 715.

A query input processing module 707 included in the user-interest quantifying module may quantify user interests of a plurality of users in the input query 770. When the input query 770 is given, the query input processing module 707 may convert text data included in the input query 770 into a query vector 780 through text embedding 733. The query vector 780 is also represented by one point in the finite-dimensional first vector space 781, second vector space 783, and third vector space 785. Since the query vector 780 exists in the same first vector space 781, second vector space 783, and third vector space 785 as the content vectors (corresponding to the first content vector of user 1 751a, the first content vector of user 2 751b, and the first content vector of user 3 751c for the app usage information 711; the second content vector for user 1 753a, the second content vector for user 2 753b, and the second content vector for user 3 753c for the search information 713; and the third content vector for user 1 755a, the third content vector for user 2 755b, and the third content vector for user 3 755c for the website visit information 715), a direct similarity comparison may be possible.

The query input processing module 707 may quantify the user interests of the plurality of users for the input query 770 as the largest value among values obtained by multiplying the similarity between the content vectors (corresponding to the first content vector of user 1 751a, the first content vector of user 2 751b, and the first content vector of user 3 751c for the app usage information 711; the second content vector for user 1 753a, the second content vector for user 2 753b, and the second content vector for user 3 753c for the search information 713; and the third content vector for user 1 755a, the third content vector for user 2 755b, and the third content vector for user 3 755c for the website visit information 715) and the query vector 780 by the weight.

The query input processing module 707 may aggregate 791 the user interest quantified for each type of the user data 710 and for each user to quantify final user interests of the plurality of users in the input query 770. The query input processing module 707 may quantify a final interest score 793 of the user as a sum of weights of the user interests quantified for each type of the user data 710.

A provider providing a personalized service may use the user interests of the plurality of users to more easily find users having specific interests and utilize the user interests for marketing.

Figure 8:
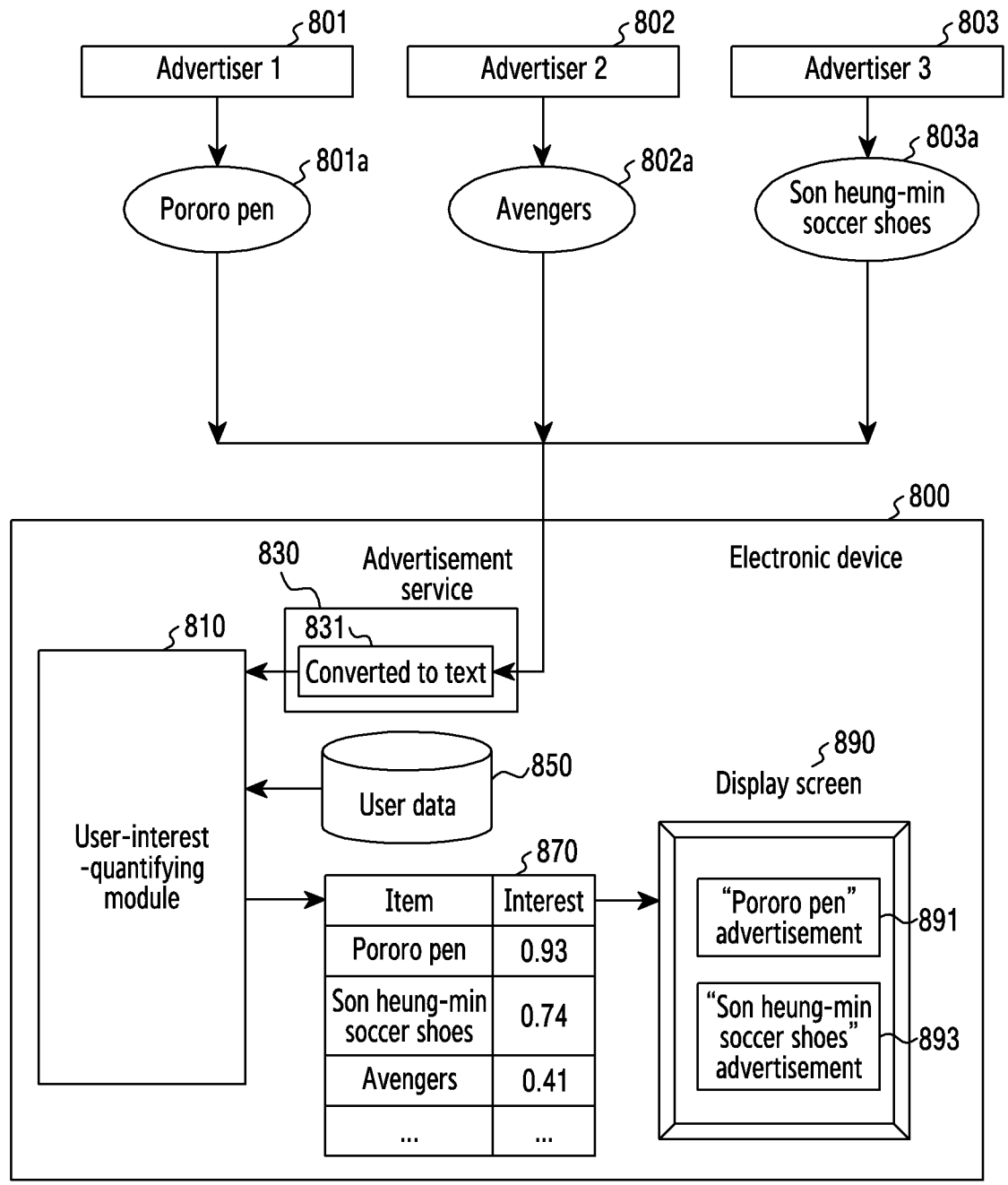
FIG. 8 is a diagram illustrating a method of providing a personalized service through a method of quantifying user interest by an electronic device, according to an embodiment.

FIG. 8 is a diagram illustrating a method of providing a personalized service through a method of quantifying user interest by an electronic device, according to an embodiment.

Referring to FIG. 8, an electronic device 800 may receive information on items (e.g., a first item ("Pororo pen") 801a, a second item ("Avengers") 802a, and a third item ("Son Heung-Min soccer shoes") 803a) from a plurality of advertisers (e.g., a first advertiser 801, a second advertiser 802, and a third advertiser 803)). The electronic device 800 may convert, to text 831, information on the items through an advertisement service providing module 830. The method of performing conversion to text 831 may include a method of using the name or title of the item and a method of using metadata such as keywords and descriptions.

When the conversion to text 831 is completed, the electronic device 800 may perform embedding processing on the result of the conversion to text 831, that is, the text data, through a user-interest quantifying module 810. For example, a query input processing module included in the user-interest-quantifying module 810 may convert the text data into a real-number vector in a finite-dimensional vector space through the text-embedding module. Here, the converted vector of the text data, obtained as the result of the conversion to text 831, may be referred to as a query vector.

The electronic device 800 may perform user-embedding processing on user data 850 in the electronic device 800 through the user-interest quantifying module 810. For example, the user may be expressed as one real-number vector in the finite-dimensional vector space and a set of weights of the real-number vector using the user data 850 through a user-embedding module included in the user-interest quantifying module 810. Here, the vector using the user data 850 may be referred to as an embedding vector.

The electronic device 800 may quantify user interest 870 in the items (e.g., the first item 801a, the second item 802a, and the third item 803a) based on the query vector, the embedding vector, and the weight.

The electronic device 800 may expose an advertisement through a screen of a display 890 only for the item having the user interest 870 with a designated size or more. For example, the electronic device 800 may output a first advertisement 891 and a second advertisement 893 for the first item 801a and the third item 803a having user interest 870 greater than or equal to a designated size on the screen of the display 890.

According to an embodiment, an electronic device may include a memory configured to store at least one type of user data and a processor configured to be operatively connected to the memory, wherein the processor may be configured to generate an embedding vector through text embedding using first text data which is included in the user data and is related to content of the user data for each type of the user data, to calculate a weight for the embedding vector using information which is included in the user data and is related to usability of the user data for each type of the user data, to generate, when a query is input, a query vector through the text embedding by using second text data included in the query, and to quantify user interest in the query for each type of the user data based on the embedding vector, the weight for the embedding vector, and the query vector.

The user data may include at least one of usage information of an application installed in the electronic device, website visit information obtained from the electronic device, or search information in the electronic device.

The processor may be further configured to extract key text from the content of the user data to obtain the first text data included in the user data.

The processor may be further configured to allow vectors generated through the text embedding to be located close to each other in a vector space when the semantic correlation between text data used for the text embedding is high, and to allow the generated vectors to be located far from each other in the vector space when the semantic correlation between the text data is low.

The processor may be further configured to represent each of the embedding vectors and the query vectors as one point in the same finite-dimensional vector space.

The processor may be further configured to calculate a similarity between the embedding vector and the query vector and to quantify the user interest as the largest value among values obtained by multiplying the similarity by the weight.

The processor may be further configured to cluster a plurality of embedding vectors based on the type of the user data.

When the cluster is configured by the clustering, the processor may be further configured to replace the embedding vector representing the cluster among the plurality of embedding vectors with a center vector of the cluster.

The processor may be further configured to quantify a final user interest in the query by aggregating the user interest quantified for each type of the user data.

The electronic device may further include a display, and the processor may be further configured to display information related to the query through the display when the user interest in the query is greater than or equal to a designated size.

Figure 9:
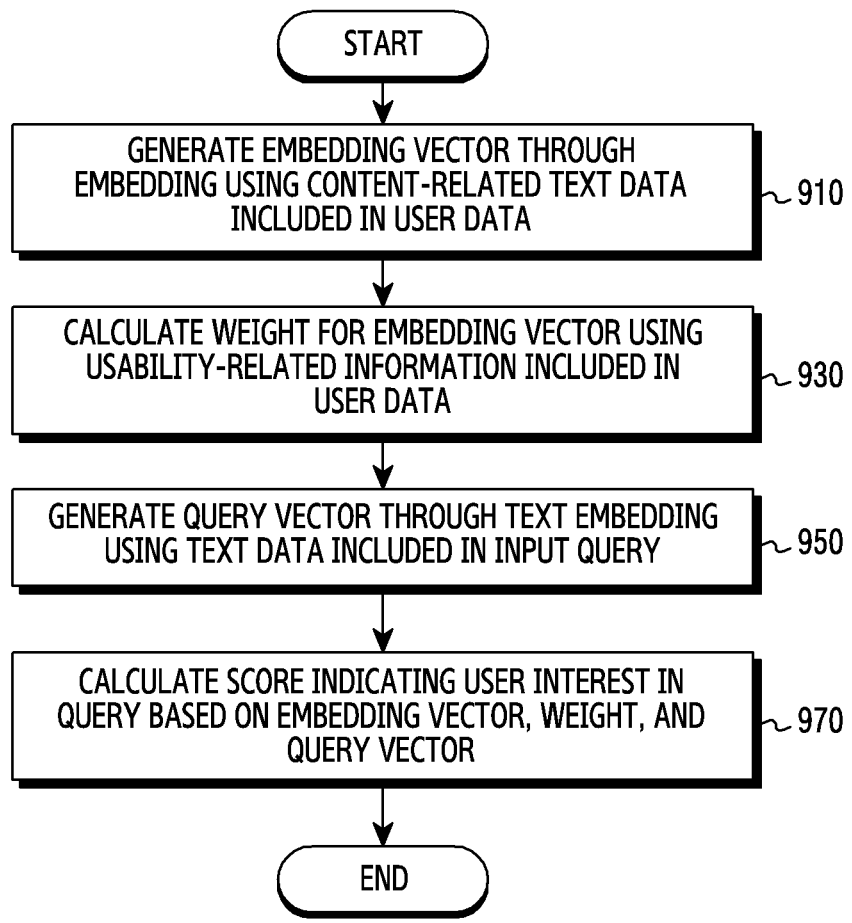
FIG. 9 is a diagram illustrating a method of quantifying user interest by an electronic device, according to an embodiment.

FIG. 9 is a diagram illustrating a method of quantifying user interest by an electronic device, according to an embodiment.

Referring to FIG. 9, a processor of an electronic device, in step 910, uses content-related text data included in user data to generate an embedding vector through text embedding. For example, the processor 120 may extract key text from content included in the user data through a user-embedding module included in the user-interest quantifying module to obtain the content-related text data included in the user data, and may convert the content-related text data included in the user data into an embedding vector represented by one point in a vector space through the text embedding.

In step 930, the processor 120 calculates a weight for the embedding vector using usability-related information included in the user data. For example, the processor 120 may calculate the weight of the embedding vector, corresponding to the content included in the user data, using information on how much, how often, or how recently the content included in the user data was used (or visited or searched for).

In step 950, the processor 120 generates a query vector through text embedding using text data included in an input query. For example, the processor 120 may extract key text from the input query through an query input processing module included in the user-interest quantifying module to obtain text data, and may convert the obtained text data into a query vector represented by one point in a vector space through the text embedding. Since the query vector exists in the same vector space as the embedding vector, a direct similarity comparison may be possible. The similarity may be calculated through cosine similarity operation.

In step 970, the processor 120 calculates a score indicating user interest in the query based on the embedding vector, the weight, and the query vector. The processor 120 may calculate the score indicating the user interest in the query as the largest value among values obtained by multiplying the similarity between the embedding vector and the query vector by the weight using the query input processing module.

According to an embodiment, a method of quantifying user interest by an electronic device may include generating an embedding vector through text embedding using first text data which is included in at least one type of user data stored in a memory of the electronic device and is related to content of the user data for each type of the user data; calculating a weight for the embedding vector using information which is included in the user data and is related to usability of the user data for each type of the user data; when a query is input, generating a query vector through the text embedding using second text data included in the query; and quantifying user interest in the query for each type of the user data based on the embedding vector, the weight for the embedding vector, and the query vector.

The user data may include at least one of usage information of an application installed in the electronic device, website visit information obtained from the electronic device, or search information in the electronic device.

Generating the embedding vector may further include extracting key text from the content of the user data to obtain the first text data included in the user data.

Vectors generated through the text embedding may be located close to each other in a vector space when the semantic correlation between text data used for the text embedding is high, and may be located far from each other in the vector space when the semantic correlation between the text data is low.

The embedding vector and the query vector generated through the text embedding may be represented by one point in the same finite-dimensional vector space.

Quantifying the user interest may further include calculating a similarity between the embedding vector and the query vector and quantifying the user interest as the largest value among values obtained by multiplying the similarity by the weight.

Quantifying the user interest may further include clustering a plurality of embedding vectors based on the type of the user data.

Quantifying the user interest may further include replacing, when a cluster is configured by the clustering, the embedding vector representing the cluster among the plurality of embedding vectors with a center vector of the cluster.

Quantifying the user interest may further include quantifying a final user interest in the query by aggregating the user interest quantified for each type of the user data.

Quantifying the user interest may further include outputting information related to the query through a display of the electronic device when the user interest in the query is greater than or equal to a designated size.

According to various embodiments of the disclosure, there is no need for an additional feature extraction process in addition to text extraction for an input query, and thus it is possible to quantify user interest in an arbitrary interest item that can be expressed in text while including an item of interest for which an interest estimation model does not exist.

In addition, according to various embodiments of the disclosure, it is possible to quantify user interest in a device (in an on-device manner) without transmitting user data from each personal terminal device to a server.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a memory configured to store a plurality of types of user data;
a communication module;
a display; and
a processor operatively connected to the memory, the communication module and the display, and configured to:
generate a plurality of embedding vectors through text embedding for each type of the user data, wherein each of the embedding vectors is generated using first text data which is included in a piece of the user data and is related to content of the piece of the user data,
calculate a plurality of first weights for each type of the user data, wherein each of the first weights for each of the embedding vectors is calculated using first information which is included in the piece of the user data and is related to usability of the piece of the user data,
receive, through the communication module, second information on at least one item from an external electronic device corresponding to at least one advertiser,
convert the second information on the at least one item to second text data by using a name or title of the at least one item and by using metadata including a keyword and description of the at least one item,
generate a query vector through the text embedding using the second text data,
calculate a plurality of first values, wherein each of the first values indicate a similarity between each of the embedding vectors and the query vector based on cosine similarity,
quantify user interests in the at least one item for each type of the user data, wherein each of the user interests is quantified as a largest value among second values obtained by multiplying each of the first values by each of the first weights,
quantify a final user interest in the at least one item as a sum of third values obtained by multiplying each of the user interests by each of second weights, wherein each of the second weights is set for each type of the user data, and
display at least one advertisement for the at least one item through the display when the final user interest in the at least one item is greater than or equal to a designated value,
wherein, when a type of the user data is related to third information on usage of applications installed in the electronic device, the first text data is obtained from metadata of the applications,
wherein, when the type of the user data is related to fourth information on visiting websites, the first text data is obtained from a title of a visited website,
wherein, when the type of the user data is related to fifth information on searching in the electronic device, the first text data is obtained from a keyword of the searching, and
wherein, when the type of the user data is related to the fourth information or the fifth information, the embedding vectors are clustered into a plurality of groups according to the type of the user data.

2. The electronic device of claim 1, wherein the processor is further configured to extract key text from the content of the piece of the user data to obtain the first text data included in the piece of the user data.

3. The electronic device of claim 1, wherein the processor is further configured to allow vectors generated through the text embedding to be located close to each other in a vector space when a semantic correlation between text data used for the text embedding is high, and to allow the generated vectors to be located far from each other in the vector space when the semantic correlation between the text data is low.

4. The electronic device of claim 1, wherein the processor is further configured to represent the embedding vectors and the query vector as one point in the same finite-dimensional vector space.

5. The electronic device of claim 1, wherein, when the cluster is configured by the clustering, the processor is further configured to replace an embedding vector representing the cluster among the plurality of the embedding vectors with a center vector of the cluster.

6. A method of quantifying user interest by an electronic device, the method comprising:
generating a plurality of embedding vectors through text embedding for each type of user data stored in a memory of the electronic device, wherein each of the embedding vectors is generated using first text data which is included in a piece of the user data and is related to content of the piece of the user data;
calculating a plurality of first weights for each type of the user data, wherein each of the first weights for each of the embedding vectors is calculated using first information which is included in the piece of the user data and is related to usability of the piece of the user data;
receiving, through a communication module of the electronic device, second information on at least one item from an external electronic device corresponding to at least one advertiser;
converting the second information on the at least one item to second text data by using a name or title of the at least one item and by using metadata including a keyword and description of the at least one item;
generating a query vector through the text embedding using the second text data;

calculating a plurality of first values, wherein each of the first values indicate a similarity between the embedding vectors and the query vector based on cosine similarity;

quantifying user interests in the at least one item for each type of the user data, wherein each of the user interests is quantified as a largest value among second values obtained by multiplying each of the first values by each of the first weights;

quantifying a final user interest in the at least one item as a sum of third values obtained by multiplying each of the user interests by each of second weights, wherein each of the second weights is set for each type of the user data; and displaying at least one advertisement for the at least one item through a display of the electronic device when the final user interest in the at least one item is greater than or equal to a designated value, wherein, when a type of the user data is related to third information on usage of applications installed in the electronic device, the first text data is obtained from metadata of the applications, wherein, when the type of the user data is related to fourth information on visiting websites, the first text data is obtained from a title of a visited website, wherein, when the type of the user data is related to fifth information on searching in the electronic device, the first text data is obtained from a keyword of the search, and wherein, when the type of the user data is related to the fourth information or the fifth information, the embedding vectors are clustered into a plurality of groups according to the type of the user data.

7. The method of claim 6, wherein generating the embedding vectors further comprises extracting key text from the content of the piece of the user data to obtain the first text data included in the piece of the user data.

8. The method of claim 6, wherein vectors generated through the text embedding are located close to each other in a vector space when a semantic correlation between text data used for the text embedding is high, and are located far from each other in the vector space when the semantic correlation between the text data is low.

9. The method of claim 6, wherein the embedding vectors and the query vector generated through the text embedding are represented by one point in the same finite-dimensional vector space.

10. The method of claim 6, further comprising:

replacing, when a cluster is configured by the clustering, an embedding vector representing the cluster among the plurality of the embedding vectors with a center vector of the cluster.

* * * * *